United States Patent
Meyer et al.

(10) Patent No.: US 6,509,544 B2
(45) Date of Patent: Jan. 21, 2003

(54) PROCESS FOR PRODUCING A METAL TUBE OF COPPER

(75) Inventors: Michael Meyer, Fuhrberg (DE); Hans-Joachim Arntz, Langenhagen (DE); Friedrich Harten, Stadthagen (DE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 09/943,350

(22) Filed: Aug. 31, 2001

(65) Prior Publication Data
US 2002/0040890 A1 Apr. 11, 2002

(30) Foreign Application Priority Data
Aug. 31, 2000 (EP) .............................................. 00402400

(51) Int. Cl.[7] .............................................. B23K 26/24
(52) U.S. Cl. .............................................. 219/121.64
(58) Field of Search ...................... 219/121.6, 121.63, 219/121.64, 121.65, 121.66, 121.83, 121.84, 121.85

(56) References Cited

U.S. PATENT DOCUMENTS

| 4,354,090 A | * | 10/1982 | Nilsen |
| 4,999,903 A | * | 3/1991 | Bujes |
| 5,676,865 A | | 10/1997 | Chang |
| 6,417,482 B1 | * | 7/2002 | Gysi |

FOREIGN PATENT DOCUMENTS

| EP | 0 496 231 A2 | 7/1992 |
| WO | WO 90/10509 | 9/1990 |

* cited by examiner

Primary Examiner—Samuel M. Heinrich
(74) Attorney, Agent, or Firm—Sughrue Mion, PLLC

(57) ABSTRACT

In a process for producing a metal tube, in which a strip of copper alloy is continuously pulled from a strip supply and is formed into a slit tube with butted strip edges, and the strip edges are laser welded, and at least the area of the strip edges is mechanically roughened prior to welding. The peak-to-valley height is above $R_a=12.5\,\mu m$, and wetting with a liquid hydrocarbon is carried out prior to welding.

6 Claims, 1 Drawing Sheet

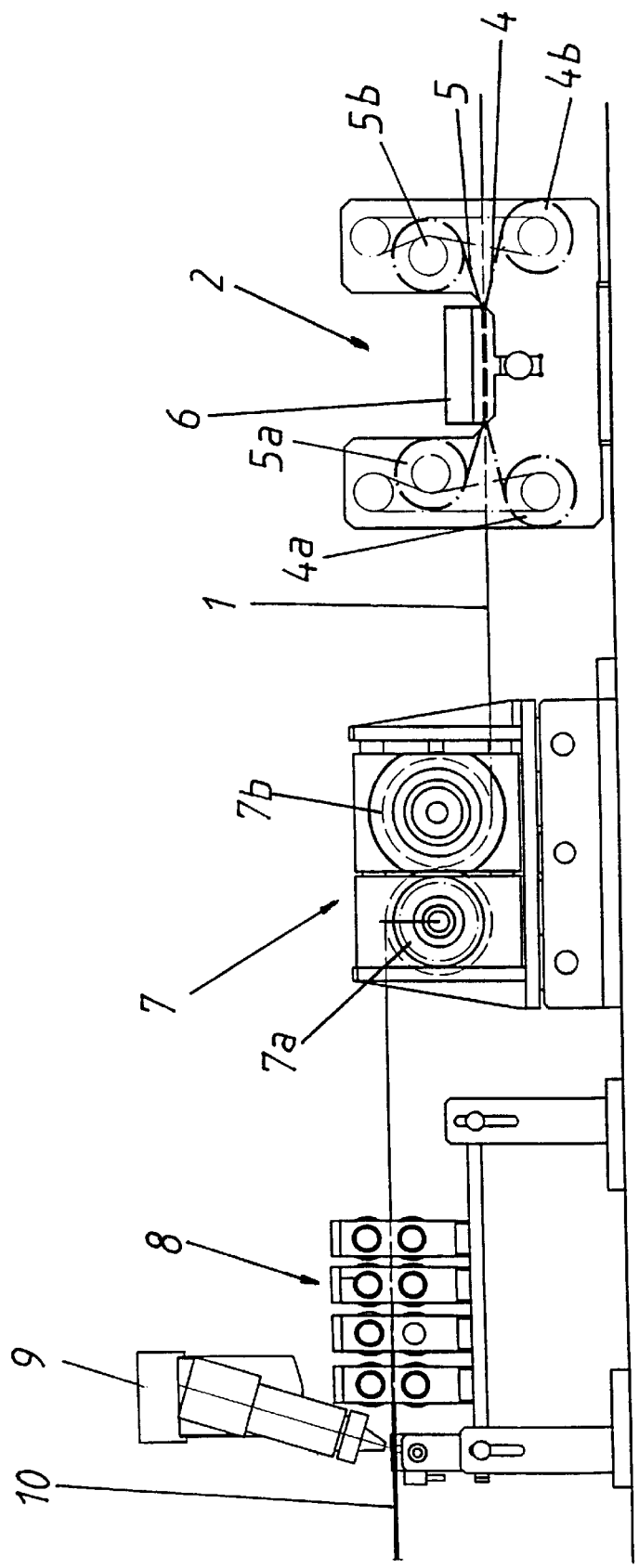

PROCESS FOR PRODUCING A METAL TUBE OF COPPER

This application is based on and claims the benefit of European Patent Application No. 00402400.6, filed Aug. 31, 2000, which is incorporated by reference herein.

BACKGROUND OF THE INVENTION

The invention relates to a process for producing a metal tube in accordance with the preamble of claim 1.

For the continuous production of metal tubes welded along their longitudinal seams, electrical seam welding processes, such as high-frequency pressure welding, resistance welding, arc welding, for instance TIG welding, or plasma welding have been known for a long time. These welding processes have proven successful for various materials and tube dimensions.

Most recently, laser welding has shown to be particularly suitable for certain materials and products, since laser welding offers some decisive advantages compared to conventional welding processes. For instance, the weld seam produced by laser welding is characterized by a slender seam geometry with a high depth/width ratio and a small heat affected zone. The reasons for these characteristics are the high, strictly limited energy input and the high welding rates.

While laser welding is already widely used for steel tubes, particularly tubes made of stainless steel or galvanized steel, or for aluminum, particularly copolymer-coated aluminum strip, this technique has not yet gained acceptance for copper or copper alloy tubes. This is due to the fact that copper, because of its bright surface, reflects the laser beam to such an extent that introducing the laser beam energy into the strip edges is prevented and welding of the strip edges is not possible.

Also, the high thermal conductivity of copper is a reason for the poor heat concentration in the area of the strip edges to be welded.

SUMMARY OF THE INVENTION

The object of the present invention is to define a process by means of which laser welded copper tubes with thin wall thicknesses can be produced in large lengths in a continuous process.

This object is attained by the combination of the characterizing features of claim 1.

Combining the features of roughening the surface of the copper tube in the area of its strip edges and wetting it with a liquid hydrocarbon makes it possible to substantially increase the introduction of the laser energy into the strip edge area. The explanation for the optimization by wetting with liquid hydrocarbon is thought to be that the hydrocarbon either deflects the laser beam, which is typically directed onto the strip edges at an angle of less than 90° because of the refraction index of the hydrocarbon, or that the laser beam burns the hydrocarbon to produce a carbon film on the strip edges, which improves the introduction of the laser energy.

BRIEF DESCRIPTION OF THE DRAWINGS

The invention will now be described in greater detail, by way of example, with the aid of the embodiment depicted in the FIGURE.

DETAILED DESCRIPTION OF THE INVENTION

A copper strip 1 pulled continuously from a coil (not depicted) is first supplied to a wetting station 2 in which strip 1 is wetted on both sides, for instance, with petroleum.

Wetting station 2 has two felt strips 4 and 5, which are pulled from a drum 4a and 5a, respectively, and are wound onto a further drum 4b or 5b. The felt strips 4 and 5 pass through a vessel 6, which contains a supply of petroleum.

The copper strip 1 wetted with petroleum is then supplied to a stamping station 7 in which at least the area of the longitudinal edge of copper strip 1 is roughened. The figure depicts two rollers 7a and 7b used for roughing. At the same time, rollers 7a and 7b serve as side cut shears, which produce a copper strip 1 with a predefined width by cutting the longitudinal edges.

Instead of roughening by means of stamping rollers 7a and 7b, brushing or sandblasting of the strip edges is also possible.

The copper strip 1 wetted with petroleum and roughened along its longitudinal edges then reaches a shaping station 8 in which the copper strip 1 is shaped into a slit tube in several steps.

A laser welding device 9, preferably a continuous-wave laser is used to weld the longitudinal edges of the slit tube. Subsequently, the welded tube 10 is fed, e.g., to a corrugation unit (not depicted), or a winding reel (also not depicted).

With the aid of the process according to the invention it has been possible to produce a copper tube with the following dimensions:

outside diameter: 3.6 mm wall thickness: 0.2 mm

The power output of the laser was 2000 W, the welding rate 20 m/min.

What is claimed is:

1. A process for producing a metal tube comprising the steps of continuously pulling a metal strip from a strip supply and forming the metal strip into a slit tube with butted strip edges, and welding the strip edges with a laser, wherein said metal strip is copper or a copper alloy, and wherein said process further comprises the steps of:

mechanically roughening at least the area of the strip edges prior to welding, with a peak-to-valley height above $R_a$=12.5 μm, and wetting at least the area of the strip edges with a liquid hydrocarbon prior to welding.

2. Process as claimed in claim 1, characterized in that a solid state laser is used.

3. Process as claimed in claim 2, characterized in that a continuous-wave solid state laser is used.

4. Process as claimed in claim 1, characterized in that a weld seam formed by welding said strip edges is protected by an inert gas during welding.

5. Process as claimed in claim 4, characterized in that a mixture of helium and argon is used.

6. Process as claimed in claim 1, characterized in that a keyhole welding process is used to obtain a high welding rate.

* * * * *